J. H. REIFSNYDER.
PROCESS OF MANUFACTURING ROLLERS FOR ROLLER BEARINGS AND THE LIKE.
APPLICATION FILED DEC. 29, 1919.
1,357,002. Patented Oct. 26, 1920.
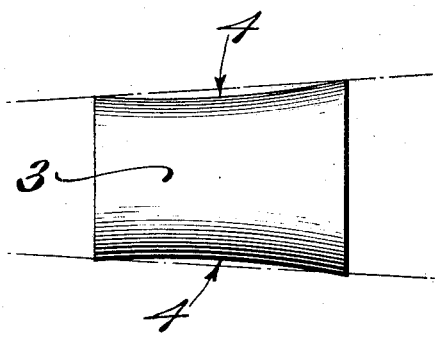
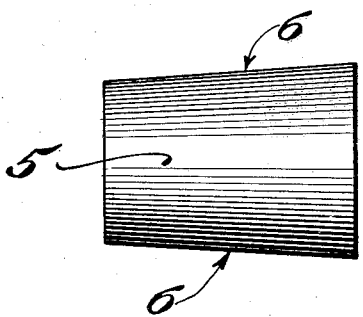

UNITED STATES PATENT OFFICE.

JOSEPH H. REIFSNYDER, OF CANTON, OHIO, ASSIGNOR TO THE TIMKEN ROLLER BEARING COMPANY, OF CANTON, OHIO, A CORPORATION OF OHIO.

PROCESS OF MANUFACTURING ROLLERS FOR ROLLER-BEARINGS AND THE LIKE.

1,357,002.  Specification of Letters Patent.  Patented Oct. 26, 1920.

Application filed December 29, 1919. Serial No. 348,033.

*To all whom it may concern:*

Be it known that I, JOSEPH H. REIFSNYDER, a citizen of the United States, and a resident of the city of Canton, in the county of Stark and State of Ohio, have invented a new and useful Improvement in Processes of Manufacturing Rollers for Roller-Bearings and the like, of which the following is a specification.

My invention relates to the manufacture of rollers of the kind used for antifriction bearings. The principal object of my invention is to overcome the effect of swelling or dilatation of the rollers incident to the heat treatment to which they are subjected in the course of manufacture. The invention consists principally in forming such rollers with a shallow concavity from end to end of such curvature that it will disappear with the swelling or dilatation of the roller incident to heat treatment.

In the accompanying drawing wherein like reference numerals refer to like parts wherever they occur, Figure 1 is a side view of the roller after being formed and burnished but prior to heat treatment, the roller at this stage of my process having a slight concavity endwise which is intentionally exaggerated in the drawing for the sake of better illustrating the conception; and Fig. 2 is a side view of the roller after undergoing heat treatment.

Antifriction rollers of the kind used for conical and cylindrical roller bearings require to have their surfaces finished with extreme precision; and it is of great importance that the longitudinal lines or elements of such surfaces shall be rectilinear. In practical manufacture, such rollers are formed, ground and burnished and then subjected to suitable heat treatment. I have found in practice that, however perfect the roller may be made prior to heat treatment, the effect of the heat treatment thereon is to swell or dilate the roller slightly in a direction at right angles to its longitudinal axis. This dilatation or swelling is a maximum midway of the length of the roll and decreases gradually toward each end thereof in a convex curve. In consequence of this swelling, it has heretofore been necessary to grind away the convexity endwise of the roller and thus sacrifice a considerable portion of the hardened shell thereof.

According to my process, the antifriction roller 3, shown in Fig. 1, is formed with a shallow concavity 4 extending from end to end thereof and throughout its entire circumference. This concavity is a maximum midway of the length of the roller and is of such depth that when the roller is submitted to heat treatment, the swelling or dilatation thereof incident to the heat treatment will bring the bottom of said concavity into a substantially rectilinear line with the two end surfaces of the roll 5 as illustrated in Fig. 2. The depth of this concavity varies more or less with the thickness and length of the roller and with the material of which it is made. By way of illustration, however, I may state that for a conical roller of one-half inch length and of a thickness of $\frac{5}{16}$ of an inch at one end and of $\frac{3}{8}$ of an inch at the other end and of steel ordinarily used for antifriction rollers, a concavity with a maximum depth of one-thousandth of an inch gives very satisfactory results. The result of the heat treatment of such a roller is to leave the roller 5 with a surface 6 that is almost exactly conical and otherwise suited to the practical requirements of an antifriction roller, so that the finishing thereof to the greatest precision requires the removal of very little or none of the hardened surface thereof.

The operation of concaving the rollers can be carried out by means of a suitably designed forming and shaving tool and a burnishing roll. For this purpose the burnishing roll is formed and ground to a convex surface, the radius of said convexity being substantially equal to or slightly less than the radius of curvature of the concavity of the antifriction rollers. By the use of such a convex burnishing roll, the necessary concavity may be formed in the antifriction rollers without other treatment.

The principal advantages of my process are that it wholly eliminates the operation of grinding the hardened rollers, preserves the entire hardened shell, and produces rollers with practically precise conical or cylindrical surfaces.

What I claim is:

1. The process of manufacturing antifriction rollers which consists in forming a roller with a slight concavity endwise thereof, and then heat treating such roller and thereby effecting the removal of such concavity by dilatation.

2. The process of manufacturing antifriction rollers which consists in forming the roller with forming and shaving tools having a convexity endwise to produce a slight concavity endwise of the roller, then burnishing the same with a roller having a convexity endwise to produce a slight concavity endwise of the roller and then heat treating such roller whereby said concavity is removed by dilatation.

3. The process of manufacturing rollers which consists in forming a roller with ends of substantially the size desired for the finished roller but whose diameter midway of its length is less than the diameter desired for the finished roller and then heat treating such roller to obtain the contour and size desired for the finished roller.

4. The process of manufacturing metal articles which consists in forming an article whose cross-section is slightly less midway of its length than is desired there for the finished article and whose cross-section gradually approaches the cross-section desired for the finished product as the ends of said article are approached and then heat treating such article to obtain the contour and size desired for the finished article.

Signed at Canton, Ohio, this 23rd day of December, 1919.

JOSEPH H. REIFSNYDER.